United States Patent [19]
Anselmino et al.

[11] 3,787,807
[45] Jan. 22, 1974

[54] MOUNTING FOR A SPEED DETECTOR

[75] Inventors: Giovanni Anselmino; Emanuele Ravizza, both of Turin, Italy

[73] Assignee: FIAT Societa per Azioni, Turin, Italy

[22] Filed: July 12, 1972

[21] Appl. No.: 273,012

[30] Foreign Application Priority Data
July 20, 1971 Italy .............................. 69436 A/71

[52] U.S. Cl. ...................... 340/62, 340/263, 307/10
[51] Int. Cl. ............................................. B60q 9/00
[58] Field of Search . 340/52 R, 53, 58, 62, 71, 263; 307/9, 10

[56] References Cited
UNITED STATES PATENTS

| | | | |
|---|---|---|---|
| 2,794,876 | 6/1957 | Phelps | 340/58 X |
| 3,629,817 | 12/1971 | Hill | 340/62 |
| 3,675,198 | 7/1972 | Drown | 340/58 |
| 3,162,835 | 12/1964 | Dudar | 340/58 |

Primary Examiner—Alvin H. Waring
Attorney, Agent, or Firm—Sughrue, Rothwell, Mion, Zinn and Macpeak

[57] ABSTRACT

An assembly for mounting a detector sensitive to the speed of rotation and angular position of a wheel and which allows the detector to be readily accessible for maintenance is disclosed. In addition the detector is spaced from the brakes of the wheel so that it is protected from the heating effect of the brakes which might affect its performance. The detector comprises a phonic wheel which is mounted for rotation about a hollow boss on which the wheel is rotatably mounted and through which passes the half-shaft from the differential, and a magnetic sensor which is secured to the boss. The magnetic sensor has an output lead which is guided by a groove formed by the cooperating longitudinal edges of a metal plate formed into a tube and located on the inside of the hollow boss in such a way that the half-shaft which passes therethrough also passes through the tube.

2 Claims, 5 Drawing Figures

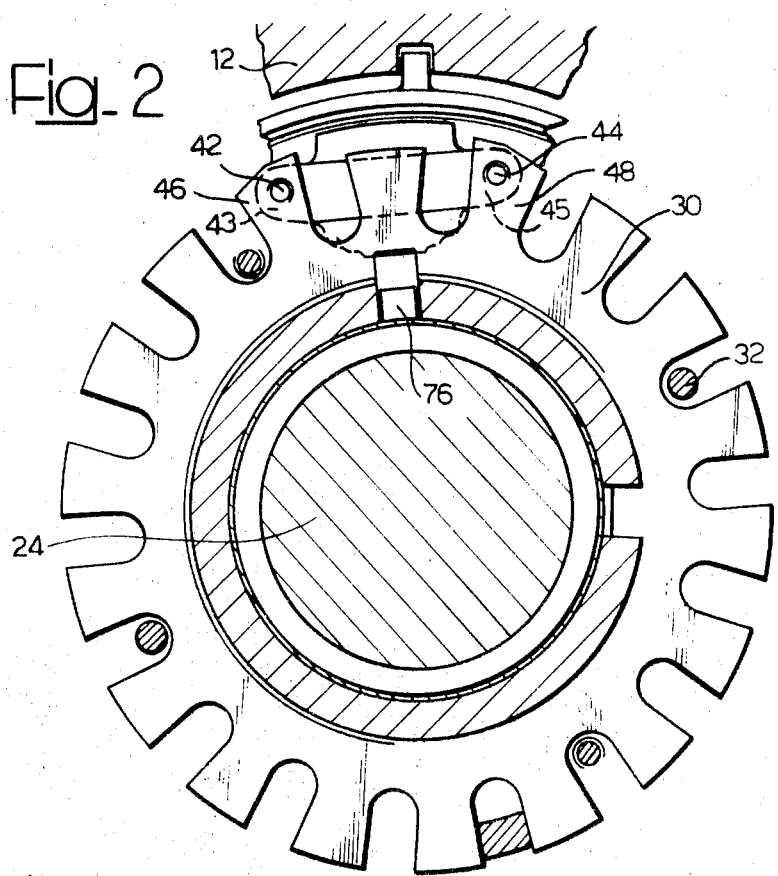
Fig. 2
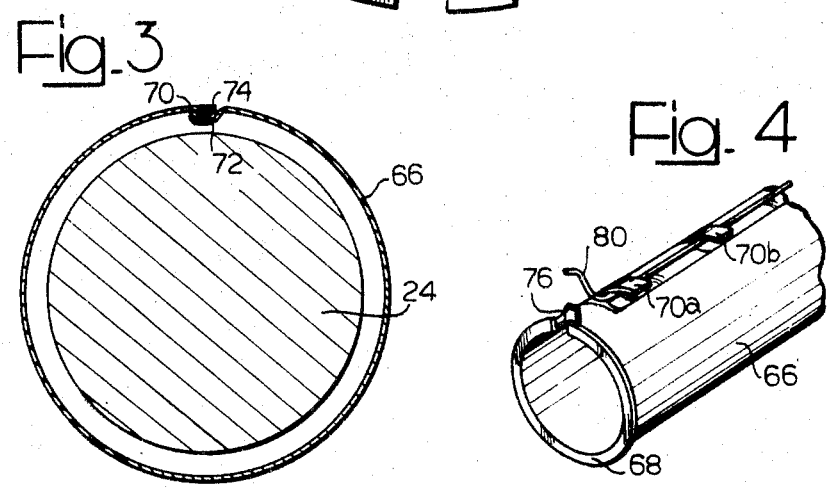
Fig. 3
Fig. 4

MOUNTING FOR A SPEED DETECTOR

BACKGROUND OF THE INVENTION

This invention relates to a mounting system for a detector device sensitive to speed and angular position. The present invention finds particular utility in connection with anti-skid braking installations. It is anticipated that the system will be used in the mounting of such a detector on a non-steering wheel of a vehicle, for example a rear driving wheel of a motor vehicle.

A basic problem which is encountered in the mounting of such detectors arises due to the necessity of protecting the detector from the heat generated by the brake of the wheel, which would otherwise alter the dimensions, and the electrical characteristics of the detector. In addition, as the detector is usually in two parts, one of which is fixed to the support of the wheel and the other mounted for rotation with the wheel itself, there is a further basic problem in the assembly of the two parts in obtaining exact spatial relation so as not to undergo variations during use.

One solution to these problems has been put forward in a previous Italian Pat. No. 915.142, in which there is disclosed an arrangement in which the detector is mounted on a device which supports both the fixed part, formed by a magnetic detector, and the mobile part, formed by a notched wheel, or "phonic wheel," the latter is rotated by means of a coupling with the wheel or some other rotating member joined to it.

In this previous arrangement the detector was installed away from the wheel, near the differential which controls the half-shaft of the wheel. This solves, therefore, the problem of protection from the heat generated by the brake, as the detector is mounted at some distance from the brake, and also the problem of the dimensional stability of the coupling between the detector and the phonic wheel, as these two elements are mounted on a single support.

However the position where the detector is mounted and the way in which it is assembled in operative relation with the half-shaft of the wheel in question make both the mounting operations and subsequent maintenance, repair or changing of the detector both long and complicated, thereby increasing the installation costs of the detector. The cost of the detector itself is also high because expensive bearings are required to mount the phonic wheel on the detector support. Dismantling of such a detector arrangement thus requires the removal of the associated half-shaft from engagement with the associated planetary gear of the differential.

In other known mounting systems, the detectors are lodged at the outside of the hub of the wheel; this has the advantage of greater accessibility to the detector for maintenance or changing, but necessitates the provision of apertures for the passage of the output leads of the detector in various parts of the assembly, such as the inside rings of the supporting bearing, fixing metal rings. This involves costly supplementary workmanship and also the components are weakened by the apertures.

OBJECT OF THE INVENTION

The object of the present invention is to provide a mounting system for a speed and angular position detector of the above-mentioned type which, while providing protection of the detector from the heat generated by the brake of the wheel and maintaining the right dimensional and spatial relations inside the detector, will also be capable of being manufactured at lower cost than has hitherto been possible, and will be readily accessible for maintenance, repair and changing of the detector, without requiring the boring of apertures or channels in structural components of the wheel or of its suspension.

SUMMARY OF THE INVENTION

According to the present invention, there is provided a mounting assembly for a detector sensitive to the speed and angular position of a wheel of a vehicle, suitable for anti-skid braking installations and of the type comprising a phonic wheel rotated by the wheel of the vehicle and a co-operating magnetic detector having an output lead, characterised in that the detector is mounted adjacent the end of a boss on which the hub of the wheel is mounted by supporting bearings, and outboard of the bearings, and in that the output lead of the detector extends inside the boss in a groove formed between two opposite longitudinal edges of a metal element bent to the shape of a tube and located inside the boss.

Two embodiments of the invention will now be more particularly described, by way of example, with reference to the accompanying drawings.

BRIEF DESCRIPTION OF THE DRAWINGS

FIG. 2 is a transverse section along the line II—II of the embodiment of FIG. 1;

FIG. 3 is a transverse section of a tubular element forming part of the embodiment of FIG. 1;

FIG. 4 is a perspective view of the tubular element of FIG. 3; and

DESCRIPTION OF THE PREFERRED EMBODIMENTS

Figure 1:
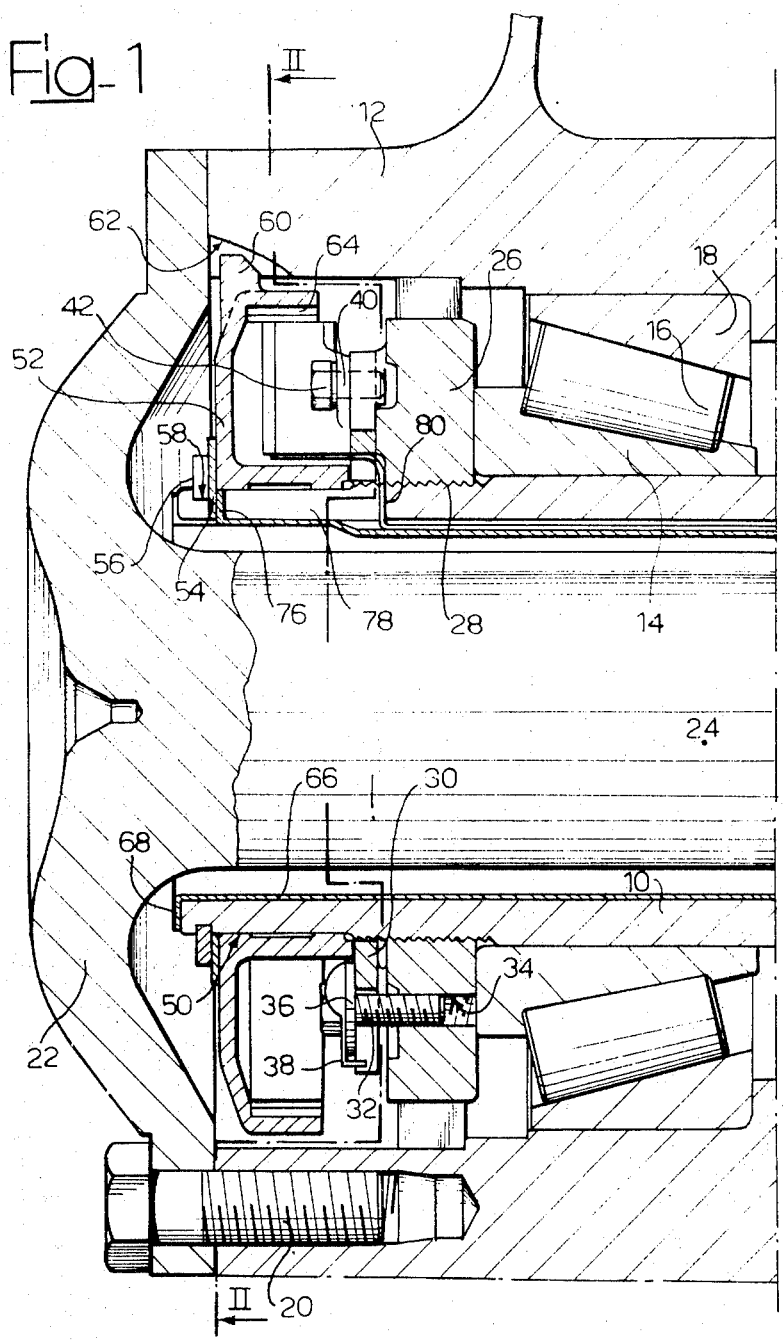
FIG. 1 is a view in axial section of a first detector mounting assembly formed as an embodiment of this invention.

With reference now to FIG. 1, there is shown a boss which supports a rotatable hub 12 of a rear wheel, by means of a pair of conical roller bearings only one of which is shown in FIG. 1, formed by an inner bearing ring 14, conical rollers 16 and an outer bearing ring 18.

The hub 12 of the wheel is fixed with bolts 20 to a plate 22 of a half-shaft 24 so as to be fixed for rotation therewith.

The inner ring 14 of the bearing shown in FIG. 1 is fixed into position by a metal ring 26 screwed on a screw-thread 28 formed on the boss 10. To the metal ring 26 is fixed a notched ring 30 by means of screws 32 passing through the notches of the ring 30 and screwed in threaded openings 34 in the metal ring 26. The head 36 of each screw 32 is held by a flanged washer 38 which can be bent over to engage one of the notches of the ring 30 to prevent the rotation of the screws 32. A magnetic detector 40 is fixed to the annular ring 30 by two screws, 42, 44, passing through ears 43, 45 which are screwed into respective openings in two notches 46, 48 of the ring 30.

On a cylindrical seat 50 of the boss 10 there is supported for rotation a bell-shaped phonic wheel 52, which is held in position by a disc 54 which in turn is locked in position by a circlip 56 set in a groove 58 at the end of the boss 10. The phonic wheel 52 has a projection 60, lightly engaged with a longitudinal groove 62 in the hub 12 of the wheel so as to be rotated thereby when the wheel rotates.

The phonic wheel 52 is made of metal, or of a self-lubricating synthetic material, with ferro-magnetic inserts 64. In either case the material must be such as to allow relative sliding movement with low firction between the phonic wheel 52 and the seat 50 of the boss 10 to minimise wearing.

With particular reference now to FIGS. 1, 3 and 4; in the cylindrical space within the boss 10, through which the half-shaft 24 passes, there is a tubular element 66 formed of curved metal plate and formed at one end with a flange 68 which engages against the outer edge of the boss 10. One of the longitudinal edges of the metal plate from which the tubular element 66 is formed, that is the edge 72, is depressed to form a groove 74 where the two edges are joined along the whole length of the tubular element 66. The other co-operating edge 70 is cut at intervals to form teeth 70a, 70b, etc. At the end of the tubular element 66 the edge 72 is cut and folded in the form of a tab 76 which is inserted in a longitudinal recess 78 in the boss 10, to secure the tubular element 66 against angular movement within the boss 10.

Into the recess 78 there also protrudes a lead 80 of the detector 40, which extends into the groove 74 formed between the edges 70 and 72 of the metal tube 66 to be guided and protected by the metal plate to the rear end of the tube (not illustrated) in which the lead leaves the groove and extends outside the boss.

Thus it will be seen that no openings are required in the structural parts of the boss and/or the supporting elements of the wheel, while at the same time the lead is protected in a suitable way from wear and tear which might lead to damage. At the same time the space occupied by the metal tube 66 in the boss 10 is small and therefore does not interfere with the normal operation nor with the normal maintenance and changing operations of the half-shafts.

Figure 5:
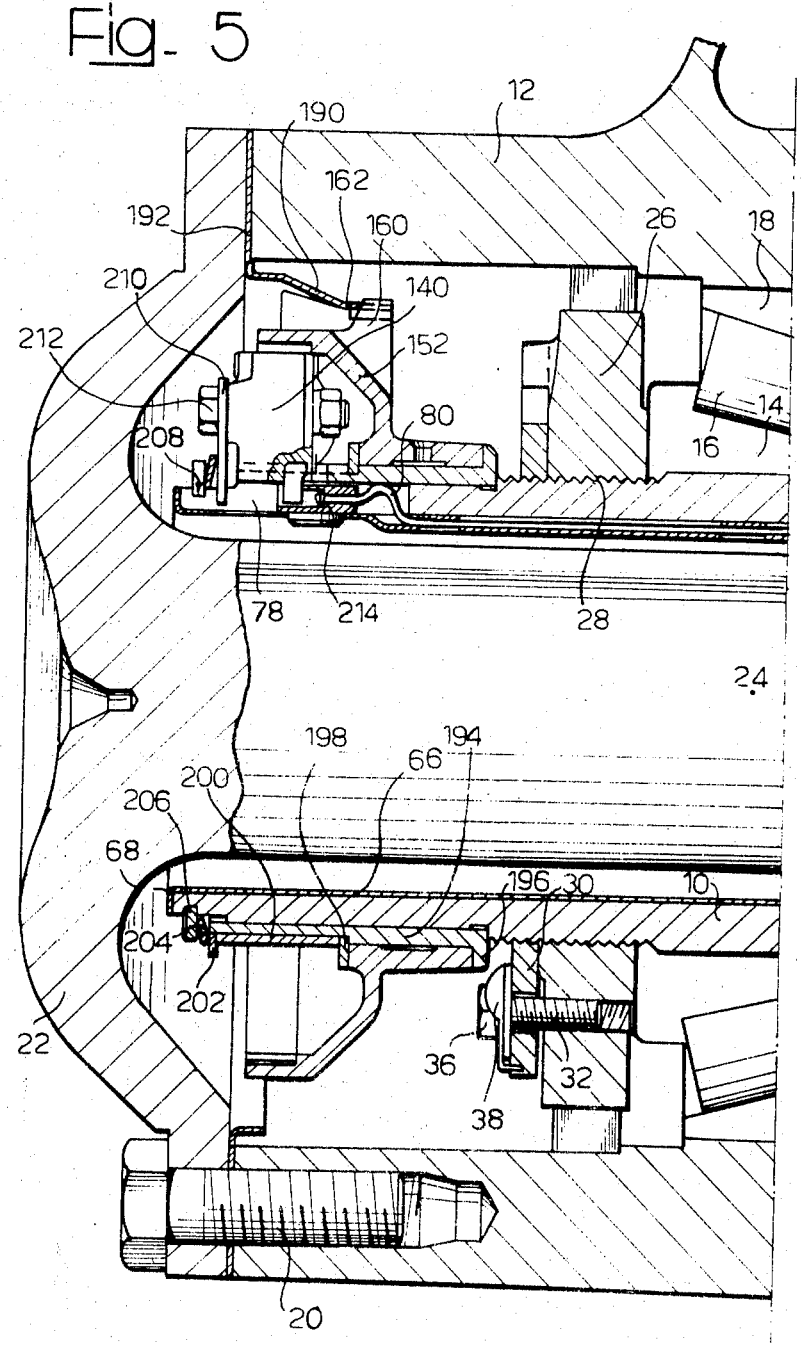
FIG. 5 is an axial section of a second mounting assembly also formed as an embodiment of this invention.

FIG. 5 shows a second embodiment of this invention; in FIG. 5 the corresponding integers are referred to by the same reference numerals as are used in FIG. 1 for corresponding parts.

The embodiment of FIG. 5 differs from that illustrated in FIGS. 1–4 by virtue of the different location of the detector 140 and of the phonic wheel 152. In this case the axial flange of the phonic wheel 152 extends outwardly and has a projection 160 which engages in a notch 162 formed in a bracket 190 of a flanged disc 192 which is clamped between the plate 22 and the hub 12. In this embodiment also the phonic wheel 152 may be formed of metal or made of a synthetic material with ferro-magnetic inserts. The phonic wheel 152 is mounted on a seat formed on a sleeve 194 carried at the end of the boss 10. The phonic wheel 152 is located axially between a radial flange 196 and a washer 198 held in place by a sleeve 200 which, in its turn, is held in place by a washer pressed by a spring washer 204 held on by a circlip 206 set in an annular groove 208 in the end of the boss 10. The washer 202 has a radially outwardly extending ear 210 to which the magnetic detector 140 is fixed with bolts such as 212.

Again, the lead 80 passes through a groove 74 in the metal tube 66 inside the boss 10, although in this case it passes through a connector 214 fixed in an opening of the metal tube 66.

In this second embodiment maintenance of the detector is easy because in this case it is only necessary to unscrew the bolts 20 and remove the half-shaft 24 to gain access to the magnetic detector 140 and the coupling area between it and the notches of the phonic wheel 152, without it being necessary to remove the phonic wheel itself.

I claim:

1. A mounting system for a detector which is sensitive to the speed and angular position of a wheel of a vehicle, the detector comprising a phonic wheel mounted for rotation with said wheel of said vehicle, a co-operating magnetic detector, and an output lead from said magnetic detector, said mounting system comprising a boss,
    bearings by means of which said wheel of said vehicle is rotatably mounted on said boss,
    means mounting said detector on said boss adjacent the end of said boss outboard of said bearings,
    means defining a hollow bore extending through said boss,
    a tubular metal element within said bore, said tubular metal element being formed of a metal sheet having first and second opposite edges and being curved such that said first and second opposite edges are longitudinal of said tubular element, said first longitudinal edge being depressed to form a groove in co-operation with said second longitudinal edge, said output lead from said detector running in said groove.

2. The mounting system of claim 1 wherein said tubular metal element is formed with an outwardly radially extending tab at one end thereof, said tab being located in a co-operating recess in said boss whereby said tubular metal element is held against rotation.

* * * * *